United States Patent
Tokioka

(10) Patent No.: US 8,753,215 B2
(45) Date of Patent: Jun. 17, 2014

(54) SPLINE TELESCOPIC SHAFT AND METHOD FOR MANUFACTURING THE SAME AND VEHICLE STEERING APPARATUS

(75) Inventor: Ryoichi Tokioka, Kashiba (JP)

(73) Assignees: JTEKT Corporation, Osaka (JP); Koyo Machine Industries Co., Ltd., Osaka (JP)

( * ) Notice: Subject to any disclaimer, the term of this patent is extended or adjusted under 35 U.S.C. 154(b) by 155 days.

(21) Appl. No.: 12/805,497

(22) Filed: Aug. 3, 2010

(65) Prior Publication Data

US 2011/0030496 A1 Feb. 10, 2011

(30) Foreign Application Priority Data

Aug. 7, 2009 (JP) ................................ 2009-184541

(51) Int. Cl.
*F16C 3/03* (2006.01)

(52) U.S. Cl.
USPC .......................................... 464/162; 74/492

(58) Field of Classification Search
USPC .......................... 74/492, 493, 496; 403/359.6; 418/201.1, 137; 72/88; 464/83, 162, 464/179–183
See application file for complete search history.

(56) References Cited

U.S. PATENT DOCUMENTS

| | | | | |
|---|---|---|---|---|
| 4,282,764 A | * | 8/1981 | Harris | 74/424.75 |
| 5,969,448 A | * | 10/1999 | Liu et al. | 310/90 |
| 6,371,507 B1 | * | 4/2002 | Durrani et al. | 280/728.2 |
| 6,381,933 B1 | * | 5/2002 | Wanner et al. | 56/13.5 |
| 7,048,972 B2 | * | 5/2006 | Kitahata et al. | 427/466 |
| 7,125,233 B2 | * | 10/2006 | Nishio | 425/145 |
| 7,595,095 B2 | * | 9/2009 | Kitahata et al. | 427/481 |
| 8,419,555 B2 | * | 4/2013 | Tokioka | 464/162 |
| 2003/0168766 A1 | * | 9/2003 | Teraoka et al. | 264/50 |
| 2005/0257639 A1 | * | 11/2005 | Yamada | 74/493 |
| 2006/0130309 A1 | * | 6/2006 | Keller | 29/558 |
| 2006/0134344 A1 | * | 6/2006 | Kitahata et al. | 427/458 |
| 2006/0213244 A1 | * | 9/2006 | Brissette | 72/46 |
| 2007/0066409 A1 | * | 3/2007 | Sekine | 464/179 |
| 2007/0157754 A1 | * | 7/2007 | Yamada | 74/493 |
| 2007/0177833 A1 | * | 8/2007 | Egami et al. | 384/279 |
| 2008/0010830 A1 | | 1/2008 | Okada et al. | |
| 2008/0070707 A1 | * | 3/2008 | Yamamoto et al. | 464/182 |

(Continued)

FOREIGN PATENT DOCUMENTS

EP 1 704 938 A1 9/2006
JP 62-96124 U 6/1987

(Continued)

OTHER PUBLICATIONS

Office Action issued by the European Patent Office on Oct. 2, 2012.

*Primary Examiner* — Troy Chambers
*Assistant Examiner* — Alexander Vu
(74) *Attorney, Agent, or Firm* — Rabin & Berdo, P.C.

(57) ABSTRACT

There is provided a spline telescopic shaft having first and second shafts that are fitted to each other slidably in an axial direction. First and second splines that engage with each other are respectively provided in the first and second shafts. A resin coating that is provided on at least a tooth surface of the first spline is fitted to a tooth surface of the second spline. The resin coating is subjected to heat fitting processing for sliding the first and second shafts in the axial direction under predetermined conditions, to fit a surface of the resin coating to the tooth surface of the second spline.

5 Claims, 12 Drawing Sheets

(56) References Cited

U.S. PATENT DOCUMENTS

| | | |
|---|---|---|
| 2008/0212908 A1* | 9/2008 | Mori et al. .................. 384/115 |
| 2008/0302208 A1* | 12/2008 | Yonenaga .................. 74/813 R |
| 2008/0314190 A1* | 12/2008 | Miyawaki et al. ............. 74/496 |
| 2009/0145257 A1* | 6/2009 | Miyawaki et al. ............. 74/493 |
| 2011/0030496 A1* | 2/2011 | Tokioka ..................... 74/492 |
| 2011/0034256 A1* | 2/2011 | Tokioka ..................... 464/162 |

FOREIGN PATENT DOCUMENTS

| | | |
|---|---|---|
| JP | 9-105419 | 4/1997 |
| JP | 2001-130420 A | 5/2001 |
| JP | 2003-278738 A | 10/2003 |
| JP | 2005-153677 A | 6/2005 |
| JP | 2006-207639 A | 8/2006 |
| JP | 2008-222016 A | 9/2008 |
| JP | 2009-168194 | 7/2009 |

* cited by examiner

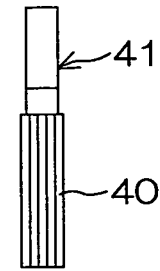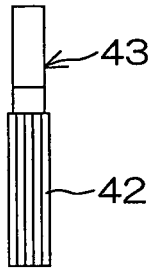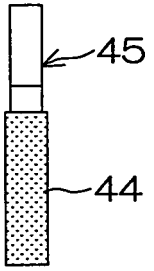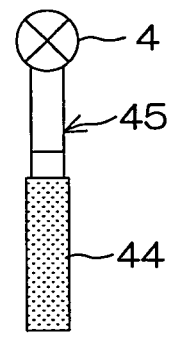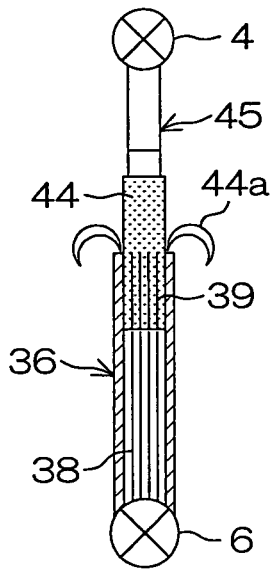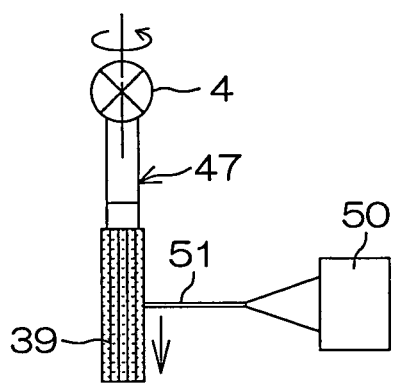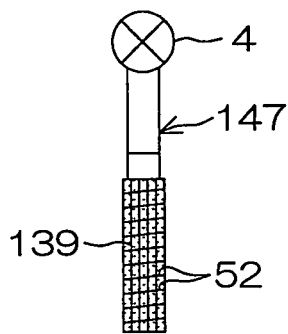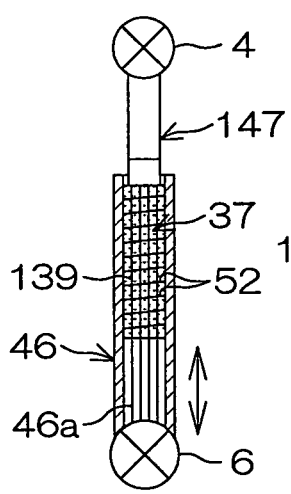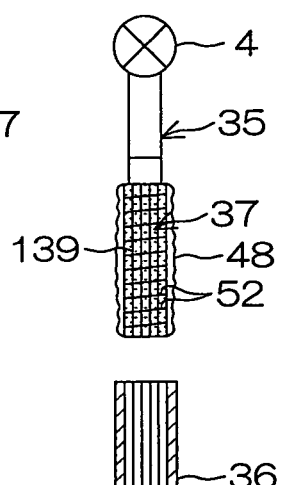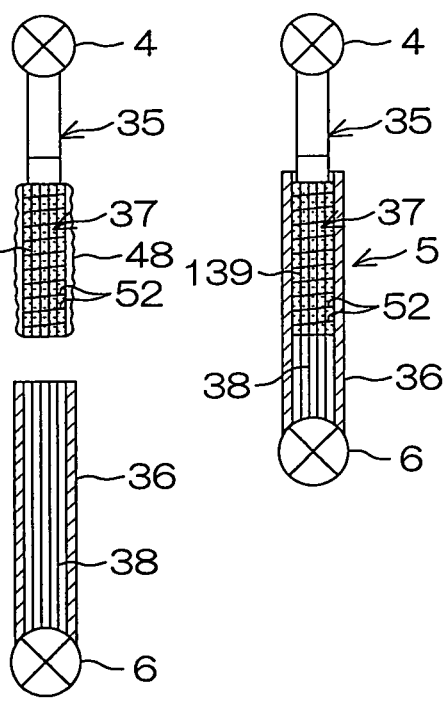

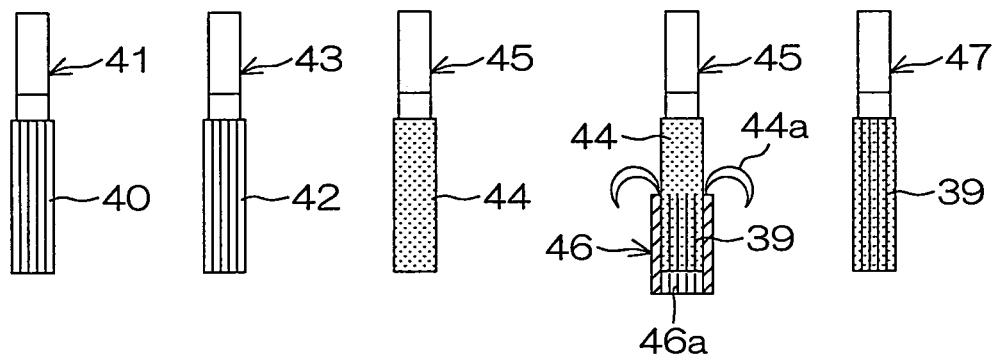
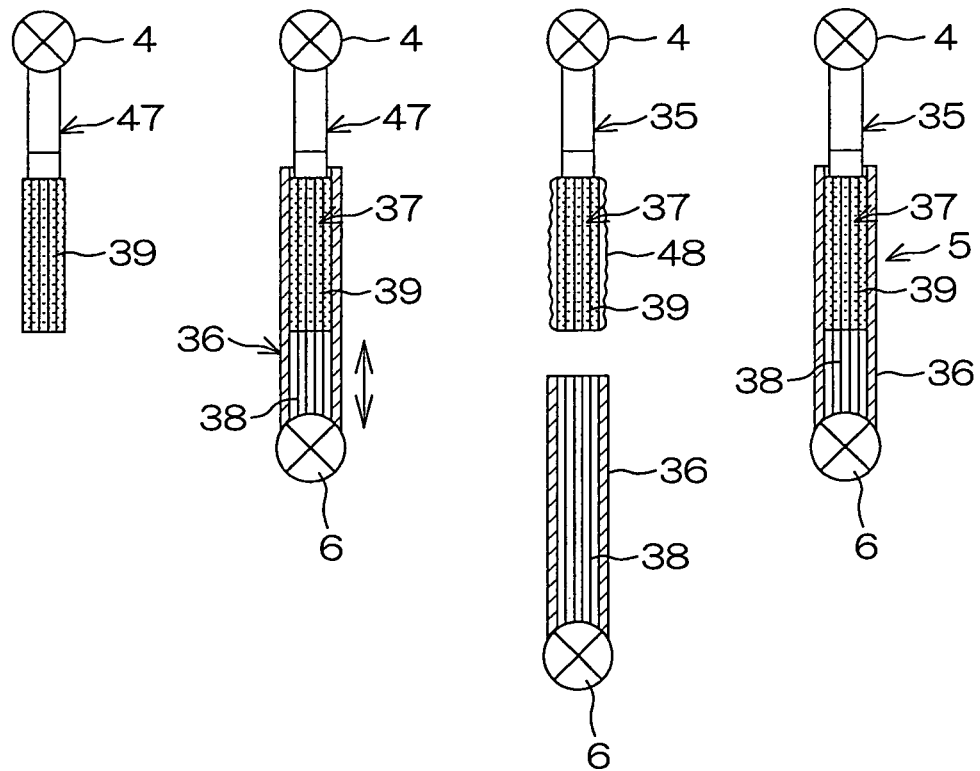

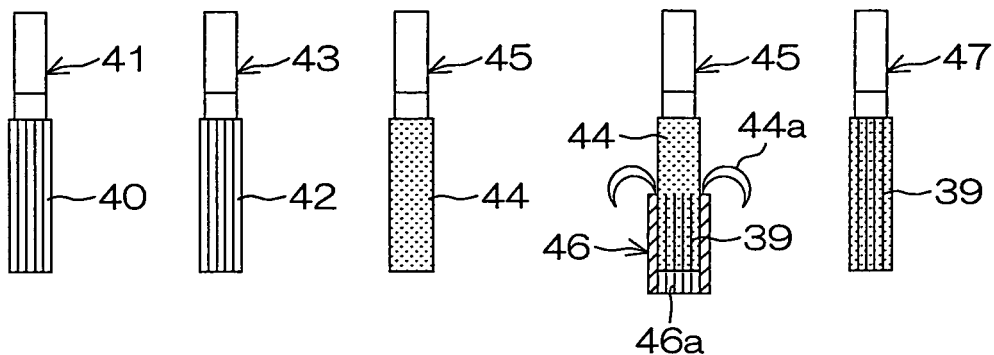
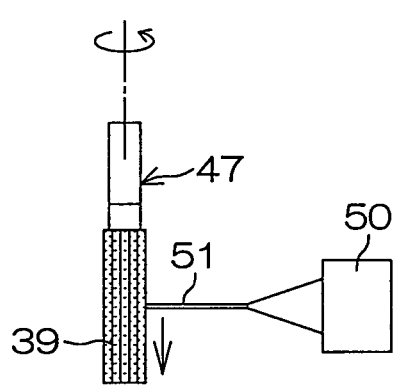
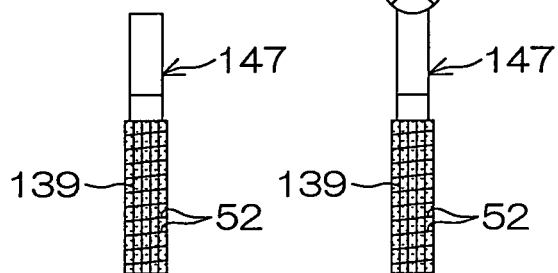
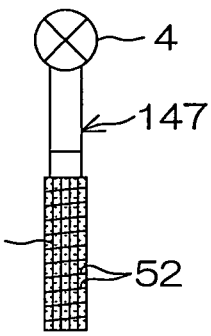
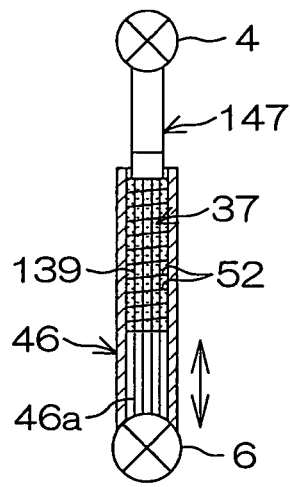
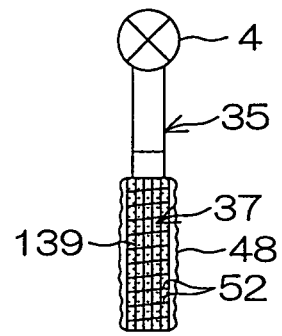
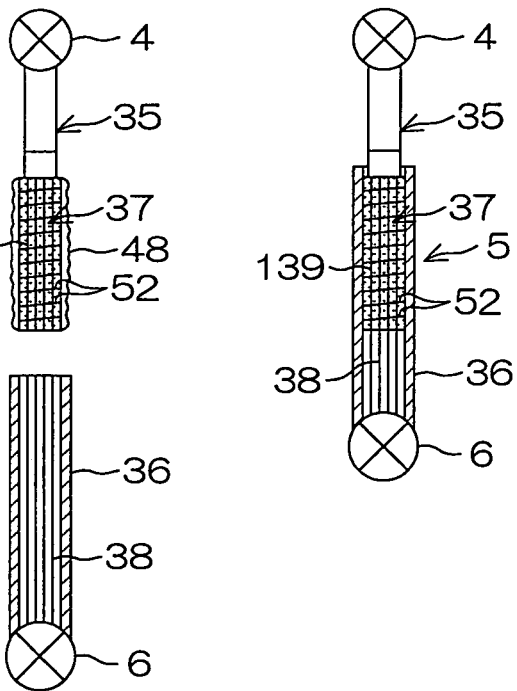

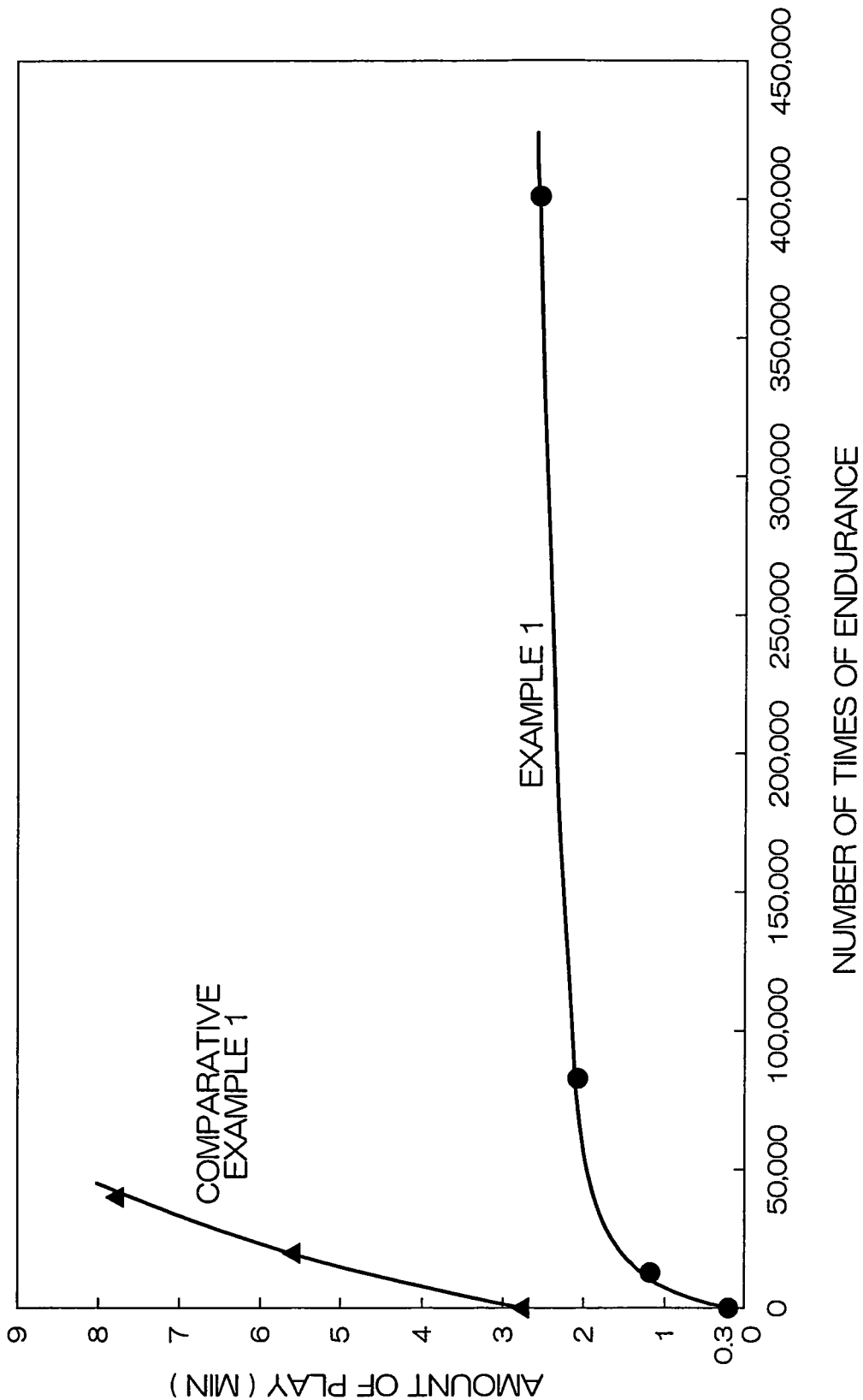

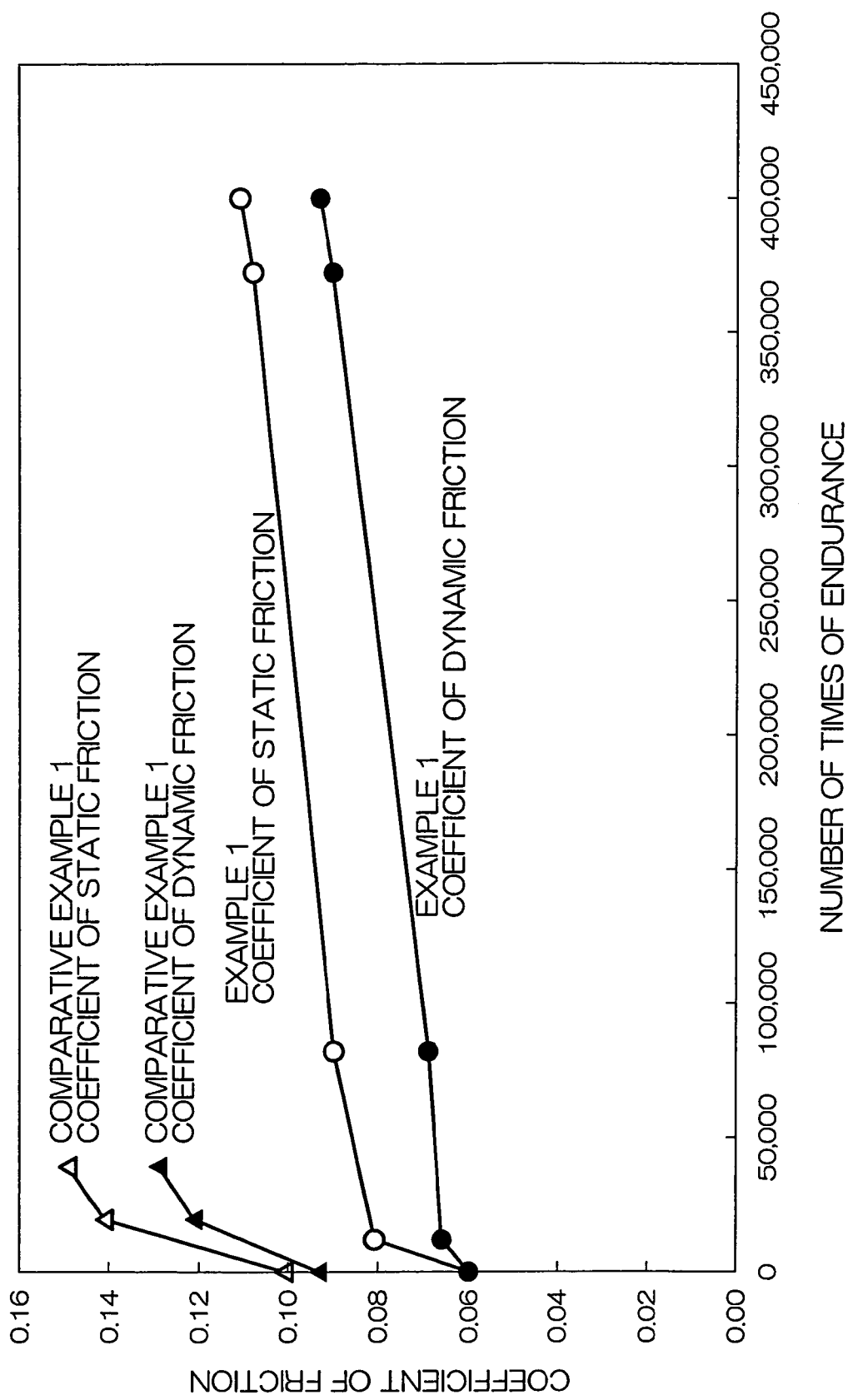

SPLINE TELESCOPIC SHAFT AND METHOD FOR MANUFACTURING THE SAME AND VEHICLE STEERING APPARATUS

BACKGROUND OF THE INVENTION

1. Field of the Invention

The present invention relates to a spline telescopic shaft, a method for manufacturing the spline telescopic shaft, and a vehicle steering apparatus.

2. Description of Related Art

A telescopic shaft for vehicle steering in which a surface hardened layer is provided on a surface of fitted teeth by shot peening processing, and a large number of minute recesses are formed on the surface hardened layer has been proposed (see, e.g., Japanese Patent Application Laid-Open No. 2005-153677). The recesses function as a grease reservoir.

A female spline manufacturing method including a process for forming a groove in a circumferential direction to be a basis of an oil reservoir on an inner peripheral surface of a hollow cylindrical material and a process for forming a female spline by plasticity processing on the inner peripheral surface of the hollow cylindrical material having the groove formed therein has been proposed (see, e.g., Japanese Patent Application Laid-Open No. 2006-207639). The groove is used as an oil reservoir by leaving a trace of the groove on a surface of a tooth surface of an inner alpine formed by the plasticity processing.

In this type of spline telescopic shaft, tooth surfaces of an inner shaft and an outer shaft may be respectively provided with resin coatings. However, backlash in a rotation direction is produced between the inner shaft and the outer shaft due to the effect of a variation in dimensional precision between both the shafts. In order to reduce the backlash, the inner shaft and the outer shaft are selected depending on the dimensional precision and combined with each other so that a fitting clearance between both the shafts becomes suitable (so-called matching assembly).

Even if no backlash is produced between both the shafts in the early stages of use, however, backlash between both the shafts is rapidly increased when a period of time for the use has elapsed.

SUMMARY OF THE INVENTION

The present invention is directed to providing a spline telescopic shaft capable of maintaining highly accurate fitting over a long period of time between first and second shafts and a method for manufacturing the spline telescopic shaft. The present invention is further directed to providing a vehicle steering apparatus capable of maintaining a good steering feeling over a long period of time.

The inventor of the present application has paid attention to the following points in solving the above-mentioned problems. Even if a resin coating is provided on one of tooth surfaces of splines in first and second shafts, there are a region where a clearance between the tooth surfaces is large and a region where the clearance is small when viewing at a surface roughness level the tooth surfaces in the early stages of use. Therefore, backlash between both the shafts is regulated only by the region where the clearance is small with an actual contact area between both the tooth surfaces being narrow. In the use for a relatively short time from the early stages thereof, therefore, the resin coating in the region where the space is small (corresponding to a region where the actual contact area is small) wears in the early stages, to reach in the early stages a state where an amount of the clearance between both the tooth surfaces is large. As a result, backlash between both the shafts is increased in the early stages. In other words, the inventor has supposed the backlash is increased in a short time from the early stages of use because the resin coating rapidly wears until both the tooth spaces are fitted to each other at a surface roughness level.

According to one aspect of the present invention, a spline telescopic shaft includes a first shaft and a second shaft that are fitted to each other slidably in an axial direction, a first spline and a second spline that are respectively provided in the first shaft and the second shaft and engage with each other, and a resin coating that is provided on at least a tooth surface of the first spline and is fitted to a tooth surface of the second spline. The resin coating is subjected to heat fitting processing for fitting the surface of the resin coating to the tooth surface of the second spline by sliding the first shaft and the second shaft in the axial direction under predetermined conditions.

In the one aspect, the resin coating that has been subjected to the heat fitting processing for the tooth surface of the second spline with a zero or negative fitting clearance therebetween on at least the tooth surface of the first spline. Therefore, the fitting clearance between corresponding tooth surfaces of the first and second splines in the early stages of use can be made substantially zero (e.g., 10 μm or less, preferably 5 μm or less) at a surface roughness level (a level of the size of irregularities caused by a striped processing trace in an axial direction produced on the tooth surface when spline processing is performed). More specifically, an actual contact area between both the tooth surfaces can be significantly widened at a surface roughness level. As a result, a highly accurate fitted state between the first shaft and the second shaft can be realized. Therefore, backlash between both the shafts can be prevented from being produced over a long period of time.

The predetermined conditions may include a first condition under which the tooth surfaces of the first spline and the second spline are fitted to each other with a zero or negative fitting clearance therebetween and a second condition under which a surface layer portion of the resin coating is heated to a temperature that is a melting point or more of resin composing the resin coating.

The surface of the resin coating in a stage before the heat fitting processing may be formed by the tooth surface of the second spline or a tool. In this case, the fitting space during the heat fitting processing can be set with high accuracy. An example of the tool is a surface broach (a broach for giving a required shape to an outer surface of a workpiece).

In another aspect, the fitting clearance between the corresponding tooth surfaces of the first spline and the second spline may be 10 μm or less. More specifically, the fitting clearance between the tooth surfaces can be substantially 10 μm or less by using the resin coating that has been subjected to the heat fitting processing. As a result, a highly accurate fitted state between the first shaft and the second shaft can be realized.

A groove extending in a direction crossing the axial direction may be formed on the surface of the resin coating. Further, at least a part of abrasion powder composed of resin produced when the heat fitting processing is performed may be contained in the groove.

In the heat fitting processing for fitting the resin coating to a counterpart using frictional heat generated by the sliding, for example, the resin softened by frictional heat is incorporated into the groove to extend in a sliding direction so that an unnecessary portion (a portion to be removed) of the softened resin is efficiently removed.

As the resin is softened, abrasion power in a roller shape that has been detached from the resin coating may be produced. In the present aspect, the abrasion powder does not roughen the surface of the resin coating because it can be incorporated into the groove. As a result, the resin coating can be fitted to the counterpart in a relatively smooth state. Therefore, a substantial contact area between the tooth surfaces of the first and second splines can be increased. As a result, a spline telescopic shaft that is superior in sliding properties and durability can be realized. Since the groove functions as a lubricant reservoir, a good lubricated state can be maintained for a long period of time.

According to another aspect of the present invention, a method for manufacturing a spline telescopic shaft having a first shaft and a second shaft that are fitted to each other slidably in an axial direction includes a surface forming step for processing a resin layer formed on at least a tooth surface of a spline in an intermediate member for manufacturing the first shaft before the surface forming step using the second shaft or a tool, to obtain a resin coating having a molded surface, and a heat fitting processing step for sliding the intermediate member for manufacturing the first shaft after the surface forming step under predetermined conditions with the first shaft manufacturing intermediate member fitted to the second shaft, to fit a surface of the resin coating to a tooth surface of the second spline in the second shaft.

In this aspect, the resin coating having the molded surface is obtained by pushing the first shaft manufacturing intermediate member, in which the resin layer is formed on at least the tooth surface of the first spline in the first shaft serving as an inner shaft, for example, into a surface broach serving as the second shaft serving as an outer shaft, for example, or a tool (a broach for giving a required shape to an outer surface of a workpiece), to cut off the resin layer. Alternatively, the resin coating having the molded surface is obtained by pushing the second shaft serving as an inner shaft, for example, into the first shaft manufacturing intermediate member, in which the resin coating is formed on at least the tooth surface of the first spline in the first shaft serving as an outer shaft, for example, to cut off the resin layer or cutting off the resin layer using an internal broach serving as a tool (a broach for giving a required shape to an inner surface of a workpiece).

Then, a resin coating having a surface that has been fitted at a surface roughness level to the tooth surface of the second spline in the second shaft can be obtained by relatively sliding the manufacturing intermediate member and the second shaft after the surface forming process. Therefore, the fitting clearance between the corresponding tooth surfaces of the first and second splines in the early stages of use can be made substantially zero at a source roughness level. More specifically, an actual contact area between both the tooth surfaces can be significantly widened at a surface roughness level. As a result, a highly accurate fitted state between the first and second shafts can be realized. Therefore, backlash between both the shafts can be prevented from being produced over a long period of time.

The heat fitting processing step may include the step of heating and melting a surface layer portion of the resin coating by frictional heat generated by the sliding between the first shaft and the second shaft. In this case, frictional heat generated by the resin coating itself is used to heat the resin coating. Therefore, no external heating means is required so that a manufacturing facility can be simplified. The higher surface pressure for a counterpart is in the resin coating, the higher frictional heat to be generated becomes. More specifically, higher frictional heat can be obtained in an area where the resin is to be softened. Therefore, the resin coating can be effectively fitted to the shape of the counterpart.

A vehicle steering apparatus for transmitting a steering force using the spline telescopic shaft can maintain a good steering feeling over a long period of time, and can reduce noise generated by a rattle sound over a long period of time.

BRIEF DESCRIPTION OF THE DRAWINGS

FIGS. 5A to 5E, 5I, 5J, and 5F to 5H are schematic views illustrating processes for manufacturing an intermediate shaft serving as a spline telescopic shaft according to another embodiment of the present invention.

FIGS. 9A to 9C, 9E1, 9E2, 9D, and 9F to 9H are schematic views illustrating processes for manufacturing an intermediate shaft serving as a spline telescopic shaft according to still another embodiment of the present invention.

FIGS. 11A to 11C, 11E1, 11E2, 11I, 11J, 11D, and 11F to 11H are schematic views illustrating processes for manufacturing an intermediate shaft serving as a spline telescopic shaft according to a further embodiment of the present invention.

FIG. 12 is a graph illustrating a relationship between the number of times of endurance and an amount of play.

FIG. 13 is a graph illustrating a relationship between the number of times of endurance and a coefficient of friction.

DETAILED DESCRIPTION OF THE PREFERRED EMBODIMENT

Preferred embodiments of the present invention will be described with reference to the accompanying drawings.

Figure 1:
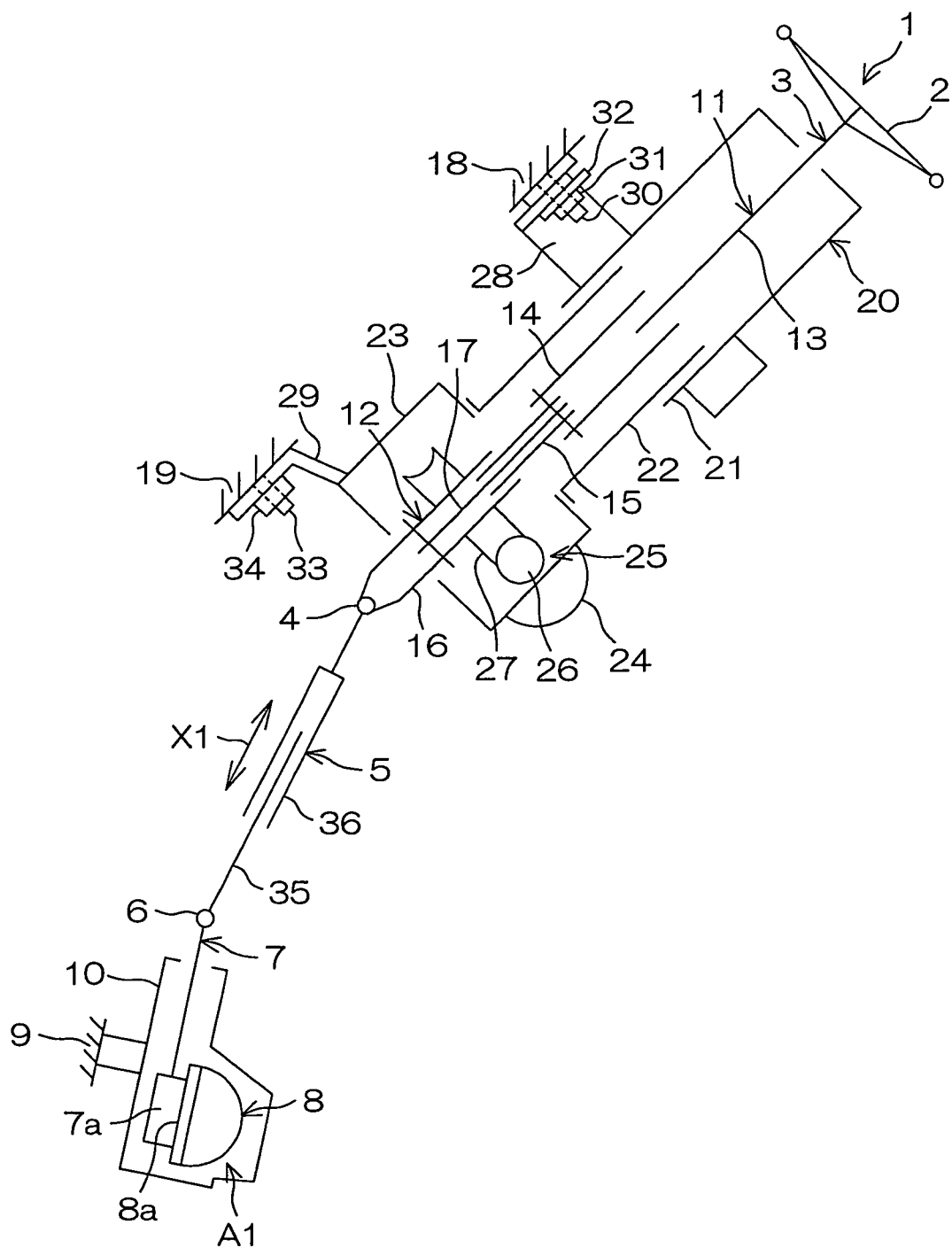
FIG. 1 is a schematic view illustrating a schematic configuration of a vehicle steering apparatus having an intermediate shaft serving as a spline telescopic shaft according to an embodiment of the present invention.

FIG. 1 is a diagram illustrating a schematic configuration of a vehicle steering apparatus having an intermediate shaft to which a spline telescopic shaft according to an embodiment of the present invention is applied. Referring to FIG. 1, the vehicle steering apparatus 1 includes a steering shaft 3 connected to a steering member 2 such as a steering wheel, and an intermediate shaft 5 serving as a spline telescopic shaft connected to the steering shaft 3 via a universal joint 4. The vehicle steering apparatus 1 includes a pinion shaft 7 connected to the intermediate shaft 5 via a universal joint 6, and a rack shaft 8 serving as a steering shaft having a rack 8a that engages with a pinion 7a provided in the vicinity of an end of the pinion shaft 7. A rack-and-pinion mechanism including the pinion shaft 7 and the rack shaft 8 constitutes a steering mechanism A1. The rack shaft 8 is supported movably in an axial direction (a direction perpendicular to paper) in a right-and-left direction of a vehicle by a housing 10 fixed to a vehicle body member 9. Each of ends of the rack shaft 8 is connected to a corresponding steering wheel via a corresponding tie rod and a corresponding knuckle arm, which is not illustrated.

The steering shaft 3 includes a first steering shaft 11 and a second steering shaft 12 that are coaxially connected to each other. The first steering shaft 11 includes an upper shaft 13 and a lower shaft 14. The upper shaft 13 and the lower shaft 14 are fitted to each other together rotatably and relatively slidably in an axial direction using spline coupling. Either one of the upper shaft 13 and the lower shaft 14 constitutes an inner shaft, and the other shaft constitutes a cylindrical outer shaft.

The second steering shaft 12 includes an input shaft 15 connected to the lower shaft 14 together rotatably, an output shaft 16 connected to the intermediate shaft 5 via the universal joint 4, and a torsion bar 17 connecting the input shaft 15 and the output shaft 16 to each other relatively rotatably.

The steering shaft 3 is rotatably supported via a bearing (not illustrated) by a steering column 20 fixed to vehicle body members 18 and 19.

The steering column 20 includes a cylindrical upper jacket 21 and a cylindrical lower jacket 22 that are fitted to each other relatively movably in the axial direction, and a housing 23 connected to a lower end in the axial direction of the lower jacket 22. The housing 23 houses a speed reduction mechanism 25 for decelerating power of an electric motor 24 for steering assist and transmitting the power to the output shaft 16.

The speed reduction mechanism 25 includes a driving gear 26 that is connected to a rotating shaft (not illustrated) of the electric motor 24 together rotatably, and a driven gear 27 that engages with the driving gear 26 and rotates together with the output shaft 16. The driving gear 26 is composed of a worm shaft, for example, and the driven gear 27 is composed of a worm wheel, for example.

The steering column 20 is fixed to the vehicle body members 18 and 19 via an upper bracket 28 on the back side of the vehicle and a lower bracket 29 on the front side of the vehicle. The upper bracket 28 can be fixed to the upper jacket 21 in the steering column 20 via a column bracket, described below. The upper bracket 28 is fixed to the vehicle body-side member 18 using a fixed bolt (stud bolt) 30 projecting downward from the vehicle body-side member 18, a nut 31 screwed into the fixed bolt 30, and a capsule 32 detachably held in the upper bracket 28.

The lower bracket 29 is fixed to the lower jacket 22 in the steering column 20. The lower bracket 29 is fixed to the vehicle body-side member 19 using a fixed bolt (stud bolt) 33 projecting from the vehicle body member 19 and a nut 34 screwed into the fixed bolt 33.

Figure 2:
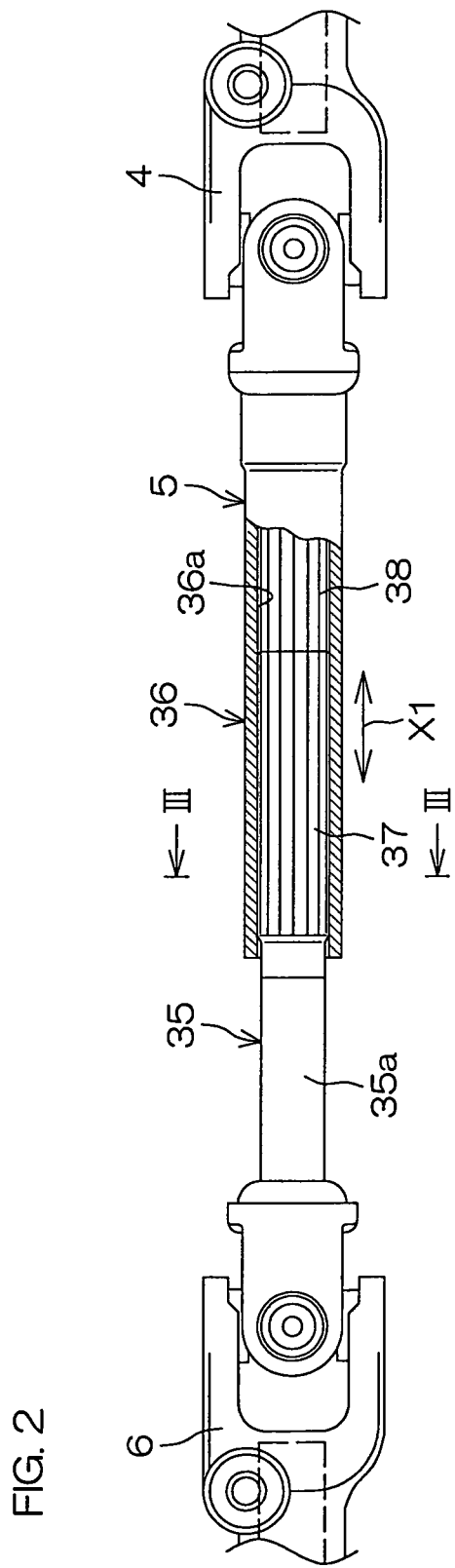
FIG. 2 is a partially broken side view of an intermediate shaft.

Referring to FIGS. 1 and 2, the intermediate shaft 5 serving as the spline telescopic shaft is formed by spline-fitting the inner shaft 35 and the cylindrical outer shaft 36 to each other slidably in the axial direction X1 and torque-transmittably. Either one of the inner shaft 35 and the outer shaft 36 constitutes an upper shaft, and the other shaft constitutes a lower shaft. In the present embodiment, the outer shaft 36 is connected to the universal joint 4 as the upper shaft, and the inner shaft 35 is connected to the universal joint 6 as the lower shaft.

Although in the present embodiment, the spline telescopic shaft is applied to the intermediate shaft 5, the spline telescopic shaft according to the present invention may be applied to the first steering shaft 11, and the first steering shaft 11 may perform a telescopic adjustment function and a shock absorption function. Although in the present embodiment, the vehicle steering apparatus 1 is an electric power steering apparatus, the spline telescopic shaft according to the present invention may be applied to a steering apparatus for a manual steering vehicle.

Figure 3:
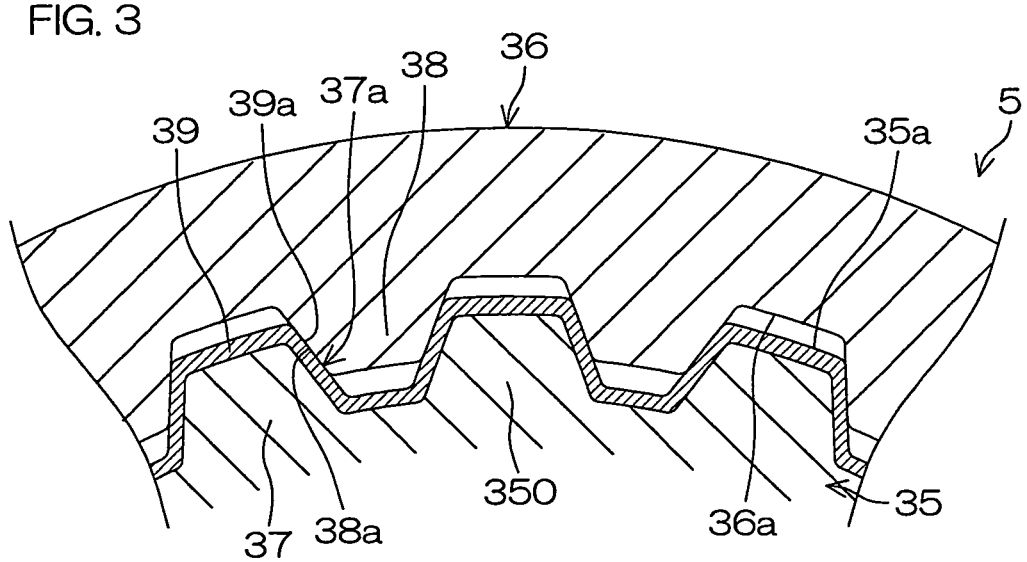
FIG. 3 is a cross-sectional view taken along a line III-III illustrated in FIG. 2.

Referring to FIGS. 2 and 3, an external spline 37 provided on the outer periphery 35a of the inner shaft 35, and an internal spline 38 provided on the inner periphery 36a of the outer shaft 36. The present embodiment is characterized in that a resin coating 39 having a surface 39a that has been subjected to heat fitting processing (see FIG. 4F) for the outer shaft 36 is formed on at lest a tooth surface 37a of the external spline 37, as illustrated in FIG. 3. More specifically, at least, a part of the resin coating 39 with which the periphery of a core 350 of the inner shaft 35 is coated forms at least the tooth surface 37a of the external spline 37.

In the present invention, out of first and second shafts that are fitted to each other slidably in the axial direction, at least a tooth surface of a first spline in the first shaft is provided with a resin coating. The first shaft is either one of the inner shaft 35 and the outer shaft 36. Although in the present embodiment, the resin coating 39 is formed on at least the tooth surface 37a of the external spline 37 serving as a first spline in the inner shaft 35 serving as a first shaft, a resin coating may be formed on at least a tooth surface 38a of the internal spline 38 serving as a first spline in the outer shaft 36 serving as a first shaft.

Processes for manufacturing the intermediate shaft 5 will be described with reference to schematic views of FIGS. 4A to 4H.

Figure 4A:
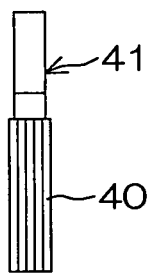
FIGS. 4A to 4H are schematic views sequentially illustrating processes for manufacturing an intermediate shaft.

First, in a casting process illustrated in FIG. 4A, a material is cast, to obtain an inner shaft manufacturing intermediate member 41 having an external spline 40 formed thereon.

Figure 4B:
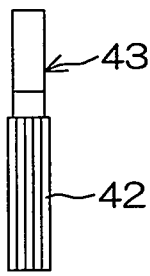

Then, in a preprocessing process illustrated in FIG. 4B, at least a tooth surface of the external spline 40 on the inner shaft manufacturing intermediate member 41 illustrated in FIG. 4A is subjected to preprocessing for coating. More specifically, base processing such as shot blasting or primer coating is performed to smooth the tooth surface as processing in a stage preceding a stage in which a resin layer 44 is formed in a coating process illustrated in FIG. 4C, described below. Thus, an inner shaft manufacturing intermediate member 43 (corresponding to the core 350 in the inner shaft 35), having an external spline 42 at least a tooth surface of which has been subjected to preprocessing, formed thereon, as illustrated in FIG. 4B, is obtained.

Figure 4C:
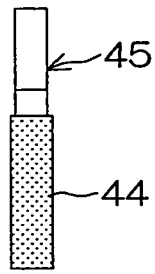

Then, in the coating process illustrated in FIG. 4C, the resin layer 44 is formed on at least the tooth surface of the external spline 42 on the inner shaft manufacturing intermediate member 43 illustrated in FIG. 4B, to obtain an inner shaft manufacturing intermediate member 45 having the resin layer 44 formed thereon, as illustrated in FIG. 4C. More specifically, the inner shaft manufacturing intermediate member 43 that has been subjected to preprocessing is heated, and is then dipped for a predetermined period of time in a dipping tank including fluidized resin powder. Thus, the resin power is melted by heat after adhering to the inner shaft manufacturing intermediate member 43, to form the resin layer 44. A cross section on the outer periphery of the resin layer 44 forms a circular shape or a substantially circular shape. Examples of resin forming the resin layer 44 include thermoplastic resin such as polyamide or polyacetal. The resin layer 44 may be injection-molded.

Figure 4D:
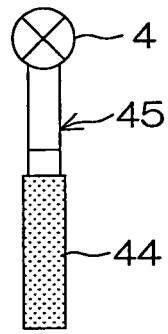

Then, in a jointing process illustrated in FIG. 4D, the universal joint 4 is connected to an end of the inner shaft manufacturing intermediate member 45.

Figure 4E:
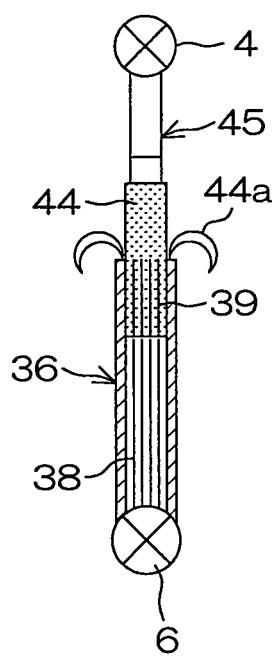
Figure 4F:
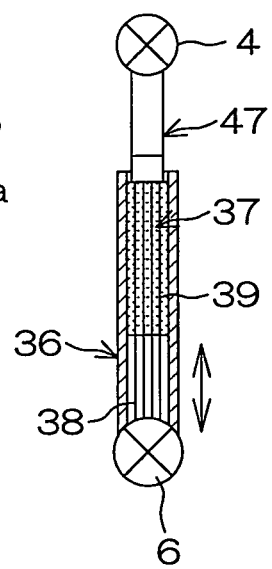

Then, in a broaching process illustrated in FIG. 4E, the inner shaft manufacturing intermediate member 45 having the resin layer 44 formed thereon is broached into the outer shaft 36 serving as a counterpart shaft. Thus, an inner shaft manufacturing intermediate member 47 having the resin coating 39 formed thereon, as illustrated in FIG. 4F, is obtained by a tooth surface 38a of an internal spline 38 in the outer shaft 36. In the broaching process, when the inner shaft manufacturing intermediate member 45 is broached, an excess portion 44a of the resin layer 44 is cut off, and is discharged out of the outer shaft 36 serving as the counterpart shaft in a manner of wood shavings.

Then, in a heat fitting process illustrated in FIG. 4F, the inner shaft manufacturing intermediate member 47 that has been inserted into the outer shaft 36 serving as the counterpart shaft is forcibly slid relative to the outer shaft 36, to complete the inner shaft 35 coated with the resin coating 39 having a surface 39a fitted to the tooth surface 38a of the internal spline 38 in the outer shaft 36.

In the heat fitting process, frictional heat generated by the forced sliding between the outer shaft 36 serving as the counterpart shaft and the inner shaft manufacturing intermediate member 47 is used, to heat and melt a surface layer portion of the resin coating 39 that contacts the outer shaft 36 to a temperature that is a melting point or more of the resin composing the resin coating 39. The resin coating 39 is fitted to the internal spline 38 in the outer shaft 36 while promoting softening of the resin in a heated state, and is then cooled. Thus, the surface 39a of the resin coating 39 can be fitted to the tooth surface 38a of the internal spline 38 in the outer shaft 36 at a surface roughness level. This completes the inner shaft 35.

Figure 4G:
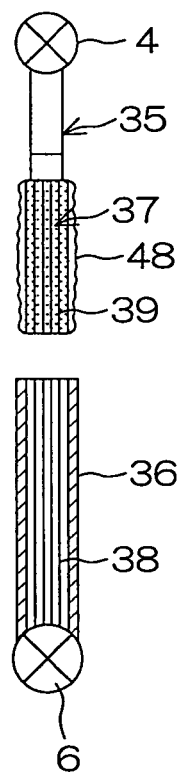
Figure 4H:
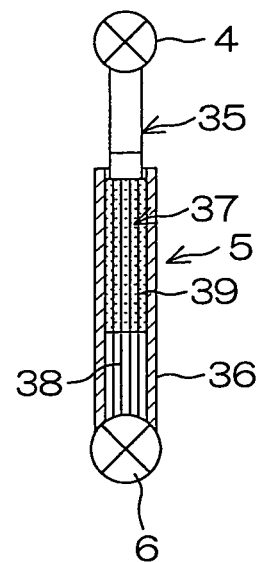

In a grease coating process illustrated in FIG. 4G, the surface 39a of the resin coating 39 on the inner shaft 35 is coated with grease 48. The inner shaft 35 coated with the grease 48 is incorporated into the outer shaft 36, to complete the intermediate shaft 5 serving the spline telescopic shaft, as illustrated in FIG. 4H.

In the method for manufacturing the spline telescopic shaft (intermediate shaft 5) according to the present embodiment, the inner shaft manufacturing intermediate member 45 having the resin layer 44 formed thereon is pushed into the outer shaft 36 serving as the counterpart shaft, to obtain the inner shaft manufacturing intermediate member 47 having the resin coating 39 on at least the tooth surface 37a of the external spline 37, and the inner shaft manufacturing intermediate member 47 is then forcibly slid relative to the outer shaft 36. Thus, the inner shaft 35 having the resin coating 39 having the surface 39a, which has been fitted at a surface roughness level to the tooth surface 38a of the internal spline 38 in the outer shaft 36, formed thereon can be obtained.

More specifically, in the spline telescopic shaft (intermediate shaft 5) according to the present embodiment, the resin coating 39 that has been subjected to the heat fitting processing for the tooth surface 38a of the internal spline 38 with a zero or negative fitting clearance therebetween is formed on at least the tooth surface 37a of the external spline 37. Therefore, a fitting clearance between the tooth surfaces 37a and 38a of both the splines 37 and 38 in the early stages of use can be made substantially zero (e.g., 10 μm or less, preferably 5 μm or less) at a surface roughness level.

More specifically, an actual contact area between both the tooth surfaces 37a and 38a can be significantly widened at a surface roughness level. As a result, a highly accurate fitted state between the inner shaft 35 and the outer shaft 36 can be realized. Therefore, backlash between the inner shaft 35 and the outer shaft 36 can be prevented from being produced over a long period of time. This enables a good steering feeling to be obtained over a long period of time while enabling noise generated by a rattle sound between the tooth surfaces 37a and 38a to be reduced. Quietness can be improved by preventing so-called stick slip between the inner shaft 35 and the outer shaft 36.

As sliding conditions between the inner shaft manufacturing intermediate member 47 and the outer shaft 36 when frictional heat generated by forced sliding between the inner shaft manufacturing intermediate shaft 47 and the outer shaft 36 is used to heat the inner shaft manufacturing intermediate member 47 in the heat fitting process illustrated in FIG. 4F, a sliding stroke between the inner shaft manufacturing intermediate member 47 and the outer shaft 36 is in a range of ±10 mm to ±50 mm, and a sliding frequency is 1.5 Hz to 10 Hz.

The necessity of an external heating unit is eliminated by using frictional heat so that a manufacturing facility can be simplified. The higher surface pressure for the counterpart is on the surface 39a of the resin coating 39, the higher frictional heat to be generated becomes. More specifically, higher frictional heat can be obtained in a region where the resin is to be softened, so that the resin coating 39 can be effectively fitted to the shape of the counterpart.

When the heat fitting processing is performed using frictional heat, the inner shaft manufacturing intermediate member 47 and the outer shaft 36 can be slid at a long sliding stroke (±30 mm or more) and at high speed (2 Hz or more) to perform the heat fitting processing at high efficiency. This is for the following reasons. More specifically, when the sliding stroke is lengthened, a heat transmission area is increased. Therefore, an amount of heat transfer relative to an amount of heat generation is increased so that a temperature rise of the outer shaft 36 can be suppressed. Thus, a ratio of the amount of heat generation to the amount of heat transfer (amount of heat dissipation) is decreased. As a result, the thickness of a softened layer is decreased. Therefore, production of abrasion power in a roller state can be suppressed so that a tooth surface can be stably formed.

In the heat fitting process, the outer shaft 36 and the inner shaft manufacturing intermediate member 47 may be heated by an external heater (not illustrated) in place of heating by frictional heat. When the outer shaft 36 and the inner shaft manufacturing intermediate member 47 are heated by an external heater, the temperature of heat to be applied from the exterior is set to a melting point or less of the resin, to forcibly slide the inner shaft manufacturing intermediate member 47 and the outer shaft 36 so that only the surface layer portion of the resin coating 39 reaches a temperature that is the melting point or more of the resin.

As described above, in the heat fitting process using frictional heat and an external heater, a groove forming process illustrated in FIG. 5I may be included between a broaching process illustrated in FIG. 5E and a heat fitting process illustrated in FIG. 5F, as illustrated in FIGS. 5A to 5H. Processes illustrated in FIGS. 5A to 5E respectively correspond to the processes illustrated in FIGS. 4A to 4E, and processes illustrated in FIGS. 5F to 5H respectively correspond to the processes illustrated in FIGS. 4F to 4H.

In the groove forming process illustrated in FIG. 5I, the surface 39a of the resin coating 39 is irradiated with a laser 51 (e.g., a YVO$_4$ laser or a CO$_2$ laser) in a direction crossing the axial direction X1 from a laser irradiation unit 50, to thermally decompose a part of the resin and remove the resin. Thus, an inner shaft manufacturing intermediate member 147 having a resin coating 139 having a continuously spiral groove 52, as illustrated in FIG. 5J, formed therein is obtained.

Figure 6:
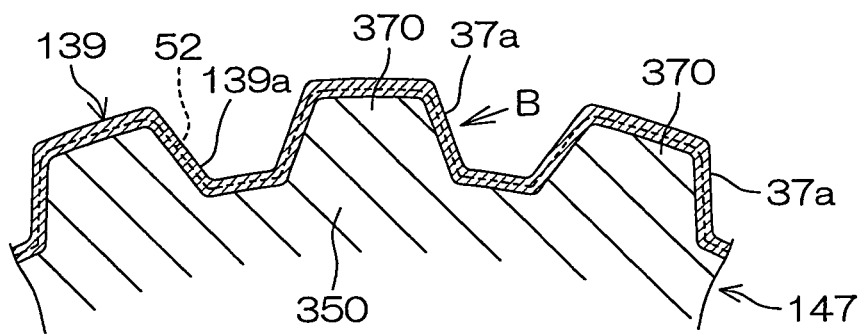
FIG. 6 is a cross-sectional view of an inner shaft manufacturing intermediate member having grooves illustrated in FIG. 5J formed therein.
Figure 7:
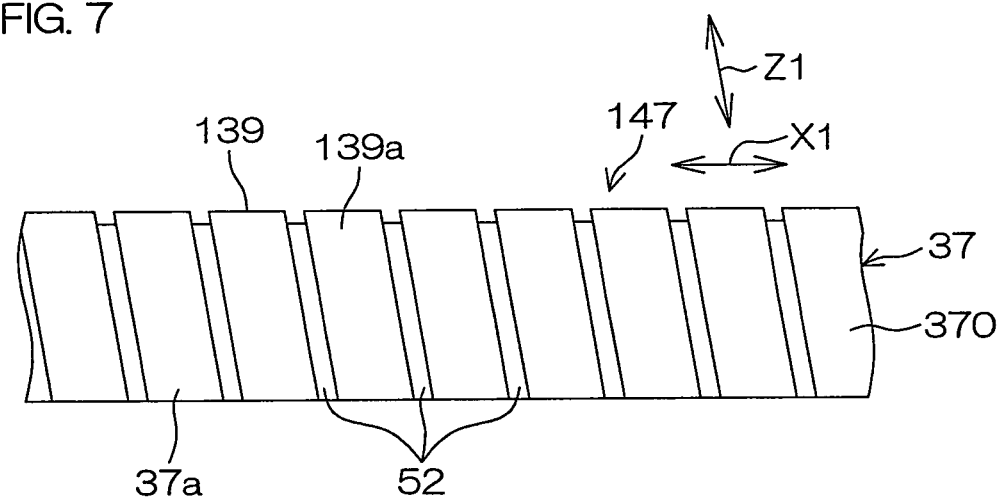
FIG. 7 is a perspective view as viewed in a direction B illustrated in FIG. 6, illustrating tooth surfaces.

The groove 52 is formed to a predetermined depth from a surface 139a of the resin coating 139, as illustrated in a cross-sectional view of FIG. 6 illustrating the inner shaft manufacturing intermediate member 147 and a perspective view of FIG. 7 taken along a line B illustrated in FIG. 6 (corresponding to a diagram as viewed in a direction opposite to tooth surfaces 37a of external spline teeth 370).

The groove 52 extends to cross each of the external spline teeth 370 in the inner shaft manufacturing intermediate member 147. As illustrated in FIG. 7, parts of the grooves 52 forming a spiral shape are arranged with predetermined spacing in the axial direction X1 of the inner shaft manufacturing intermediate member 45 on the tooth surfaces 37a of the external spline teeth 370, and extend in a direction Z1 inclined at a predetermined angle to a radial direction of the inner shaft manufacturing intermediate member 45.

The grooves 52 may be continuously formed, or may be intermittently formed. Although the grooves 52 may form a spiral shape, as described above, a plurality of annular grooves extending in a circumferential direction of the inner shaft 35 may be spaced apart in the axial direction X1, which is not illustrated.

Figure 8:
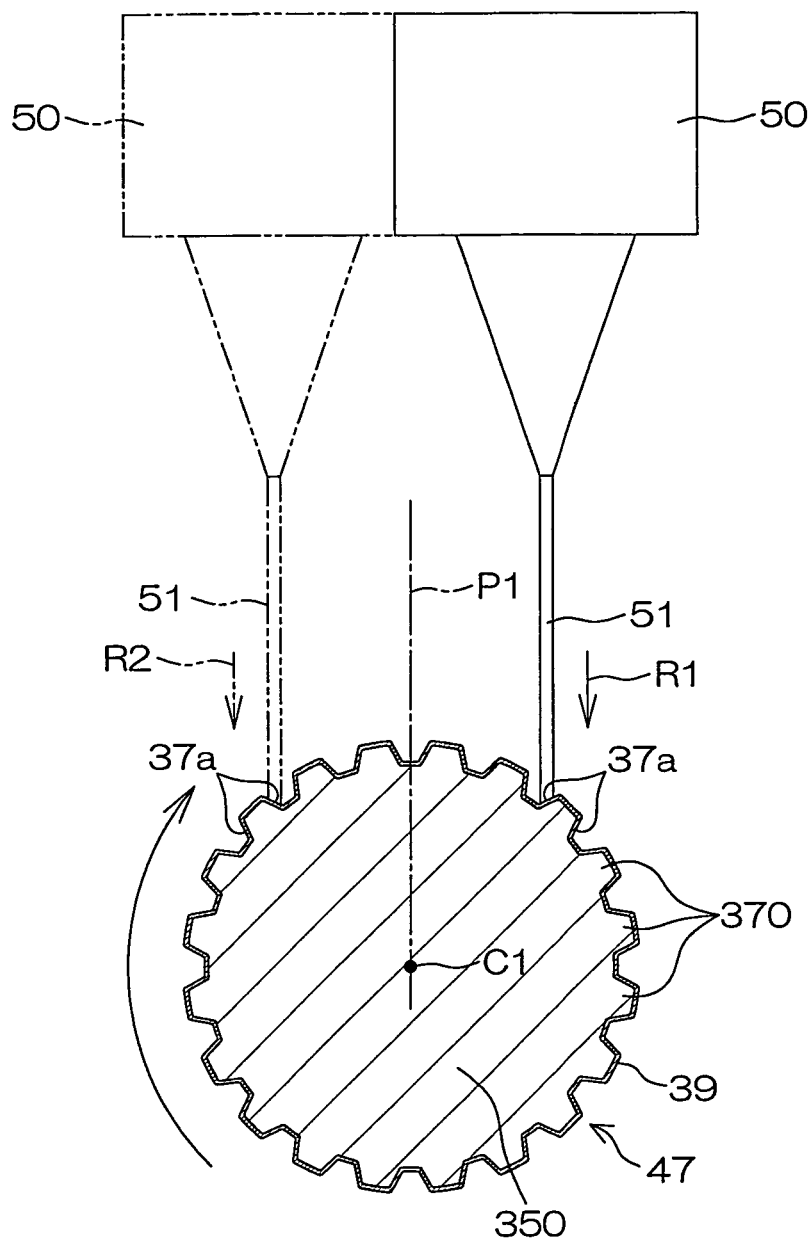
FIG. 8 is a schematic view of a method for subjecting a resin coating to groove processing using a laser.

The groove 52 is formed on the one tooth surface 37a of the external spline tooth 370 by irradiating the laser 51 in an irradiation direction R1 perpendicular to an axial direction Y1 (a direction perpendicular to paper) of the inner shaft manufacturing intermediate member 45 from the laser irradiation unit 50 at a position indicated by a solid line in FIG. 8 and relatively moving the laser 51 and the inner shaft manufacturing intermediate member 45 in the axial direction Y1 while rotating the inner shaft manufacturing intermediate member 45, for example.

The laser irradiation unit 50 is then displaced to a position indicated by a two-dot and dash line illustrated in FIG. 8 by parallel displacement in a direction perpendicular to the irradiation direction R1, to irradiate the laser 51 in an irradiation direction R2 perpendicular to the axial direction Y1 of the inner shaft manufacturing intermediate member 45. The laser 51 and the inner shaft manufacturing intermediate member 45 are relatively moved in the axial direction Y1 while rotating the inner shaft manufacturing intermediate member 45, to form the groove 52 on the other tooth surface 37a of the external spline tooth 370.

In FIG. 8, the position indicated by the solid line and the position indicated by the two-dot and dash line of the laser irradiation unit 50 are symmetric with respect to a plane P1 including a central axis C1 of the inner shaft manufacturing intermediate member 45 and parallel to the irradiation direction R1 of the laser 51.

Processing by the laser 51 may be replaced with fine groove processing by water jets or compressed air including hard fine particles.

The following is the meaning that the groove 52 is provided. More specifically, in the heat fitting process illustrated in FIG. 5E for fitting the resin coating 139 in a heated state by frictional heat or an external heater to the tooth surface 38a of the internal spline 38 in the outer shaft 36, softened resin receives shearing resistance between the tooth surface 38a in the outer shaft 36 and unsoftened resin, so that abrasion power in a roller shape detached in a manner of bits of eraser grit from the surface 139a of the resin coating 139 may be produced. On the other hand, the groove 52 is provided on the surface 139a of the resin coating 139 so that the abrasion power can be incorporated into the groove 52. Therefore, no abnormal abrasion occurs on the surface 139a of the resin coating 139, that is, the surface 139a is not roughened by making the abrasion power huge. Thus, the surface 139a of the resin coating 139 can be fitted to the counterpart in a relatively smooth state.

Therefore, a substantial contact area between the tooth surfaces 37a and 38a of the external spline 37 and the internal spline 38 can be increased. As a result, the intermediate shaft 5 (or the first steering shaft 11) serving as the spline telescopic shaft that is superior in sliding properties and superior in durability can be realized. When the intermediate shaft 5 is used, the groove 52 functions as a lubricant reservoir. Therefore, a good lubricated state can be maintained for a long period of time.

The depth of the groove 52 can be at least one of 50% or more or 0.1 mm or more of the thickness of the resin coating 139. The groove width of the groove (the width of the groove 52 in the axial direction X1) can be 0.2 mm or more and 1 mm or less.

A space between the grooves 52 in the axial direction X1 can be one to ten times the height of spline teeth.

According to the embodiment illustrated in FIGS. 5A to 5H, a similar function effect as that in the embodiment illustrated in FIGS. 4A to 4H can be produced. More specifically, the resin coating 139 that has been subjected to heat fitting processing for the tooth surface 38a of the internal spline 38 with a zero or negative fitting clearance therebetween is formed on at least the tooth surface 37a of the external spline 37. Therefore, the fitting clearance between the tooth surfaces 37a and 38a of both the splines 37 and 38 in the early stages of use can be approximately zero (e.g., 10 μm or less, preferably 5 μm or less) at a surface roughness level. More specifically, an actual contact area between both the tooth surfaces 37a and 38a can be significantly widened at a surface roughness level. As a result, a highly accurate fitted state between the inner shaft 35 and the outer shaft 36 can be realized. Therefore, backlash between the inner shaft 35 and the outer shaft 36 can be prevented from being produced over a long period of time. This enables a good steering feeling to be obtained over a long period of time while enabling noise generated by a rattle sound between the tooth surfaces 37a and 38a to be reduced. Quietness can be improved by preventing so-called stick slip between the inner shaft 35 and the outer shaft 36.

Particularly when the heat fitting processing using frictional heat is performed, a manufacturing facility can be simplified. In the heat fitting processing, however, heating using an external heater may be used. Since the groove 52 is provided in the resin coating 139 that has not been subjected to the heat fitting processing using frictional heat or an external heater, the abrasion power produced in the heat fitting process can be incorporated into the groove 52. Therefore, the surface 139a of the resin coating 139 can be made smoother. This enables a more highly accurate fitted state between the inner shaft 35 and the outer shaft 36 to be realized, thereby more reliably preventing backlash between the inner shaft 35 and the outer shaft 36 to be produced over a long period of time. Therefore, a good steering feeling can be obtained over a long period of time. Further, noise generated by a rattle sound between the tooth surfaces 37a and 38a can be further reduced. Quietness can be improved by reliably preventing so-called stick slip between the inner shaft 35 and the outer shaft 36.

FIGS. 9A and 9H illustrate a method for manufacturing an intermediate shaft serving as a spline telescopic shaft in still another embodiment of the present invention. The following is a difference between the embodiment illustrated in FIGS. 9A to 9H and the embodiment illustrated in FIGS. 4A to 4H. More specifically, in the embodiment illustrated in FIGS. 4A to 4H, in the broaching process illustrated in FIG. 4E after the jointing process illustrated in FIG. 4D, the inner shaft manufacturing intermediate member 45 is pushed into the outer shaft 36 serving as the counterpart shaft to form the resin coating 39 by cutting off the resin layer 44. On the other hand, in the embodiment illustrated in FIGS. 9A to 9H, an inner shaft manufacturing intermediate member 45 is pushed into an annular surface broach 46 for forming an inner shaft in order to form a resin coating 39 by cutting off a resin layer 44 in a broaching process illustrated in FIG. 9E1 before a jointing process illustrated in FIG. 9D.

The surface broach means a broach for giving a required shape on an outer surface of a workpiece. On the other hand, a broach for giving a required shape to an inner surface of the workpiece is referred to as an internal broach.

In the broaching process illustrated in FIG. 9E1, an excess portion 44a of the resin layer 44 is cut off by a tooth surface of an internal spline 46a on the inner periphery of the surface broach 46, to obtain an inner shaft manufacturing intermediate member 47 having a resin coating 39 formed thereon, as illustrated in FIG. 9E2. The inner shaft manufacturing intermediate member 47 is inserted into an outer shaft 36 serving as a counterpart shaft in a heat fitting process illustrated in FIG. 9F via a jointing process illustrated in FIG. 9D, to perform heat fitting processing. In the heat fitting process illustrated in FIG. 9F, the outer shaft 36 and the inner shaft manufacturing intermediate member 47 may be heated by frictional heat, or may be heated by an external heater (not illustrated).

In the embodiment illustrated in FIGS. 9A to 9H, the dedicated surface broach 46 is used in the broaching process illustrated in FIG. 9E in addition to producing a similar function effect to that illustrated in FIGS. 4A to 4H. Therefore, the resin layer 44 can be efficiently cut off.

Figure 10A:
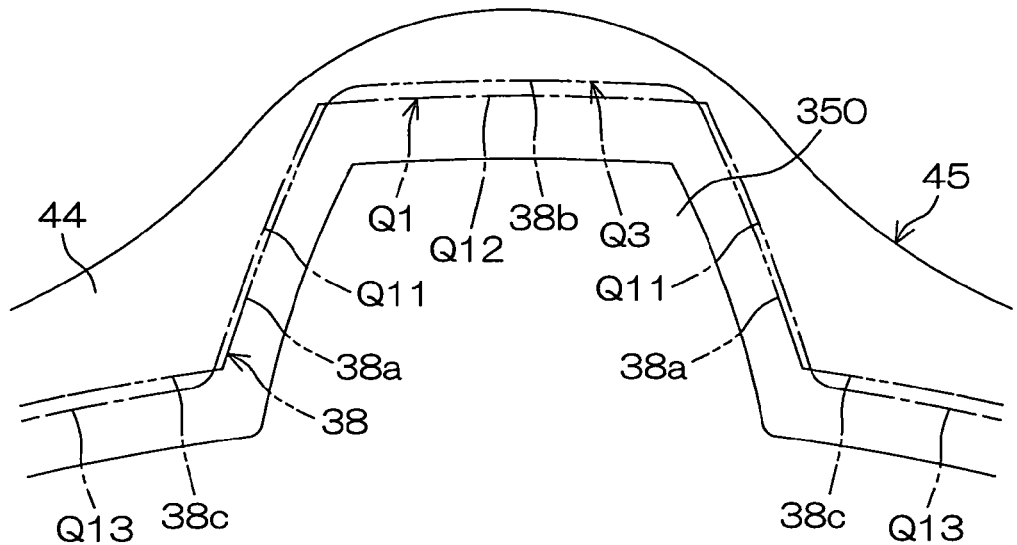
FIG. 10A is a schematic view illustrating a relationship between a contour shape on the inner periphery of a surface broach used in a broaching process illustrated in FIG. 9E1 and a contour shape of an internal spline in an outer shaft.
Figure 10B:
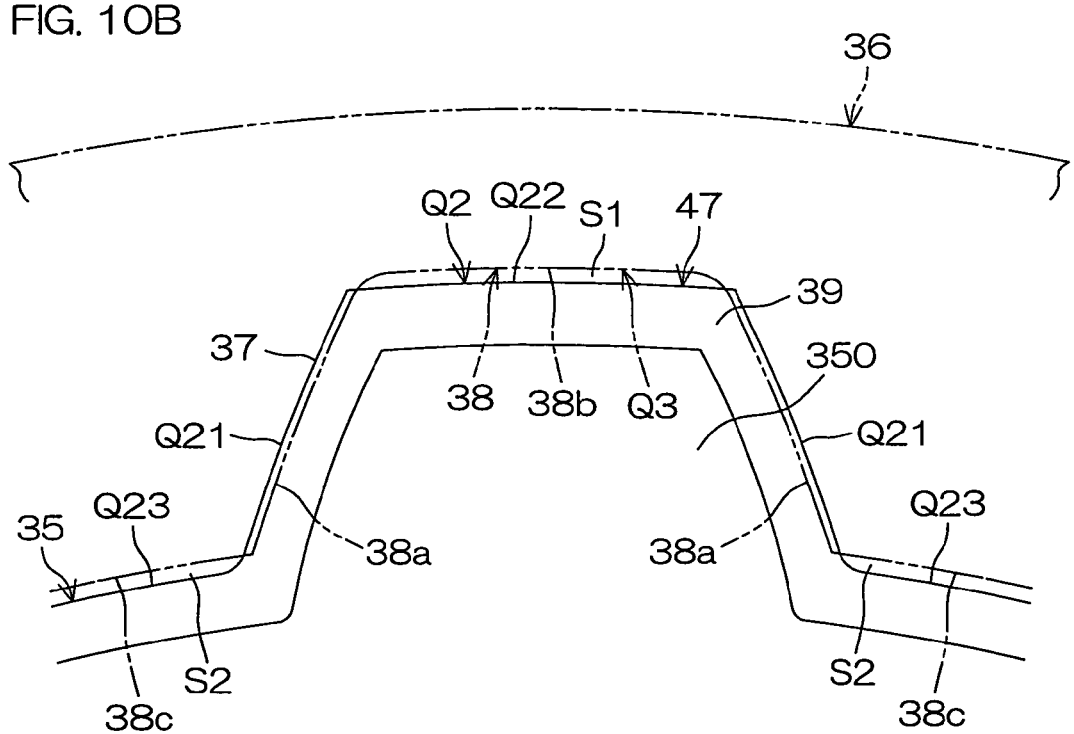
FIG. 10B is a schematic view illustrating a relationship between a contour shape of a surface of a resin coating molded with the surface broach and a contour shape of an internal spline in an outer shaft.

When the resin coating 39 is formed by cutting off the resin layer 44 on the inner shaft manufacturing intermediate member 45 using the surface broach 46 as in the present embodiment, a contour shape Q1 on the inner periphery of the surface broach 46 illustrated in FIG. 10A (which is matched with a contour shape Q2 on a surface of a resin coating 39 illustrated in FIG. 10B) has the following relationship with a contour shape Q3 of an internal spline 38 in the outer shaft 36 (corresponding to a tooth surface 38a, a large-diameter portion 38b, and a small-diameter portion 38c).

More specifically, referring to FIG. 10B, in the contour shape Q2 of the resin coating 39 (which is matched with the contour shape Q1 of the surface broach 46), a tooth surface Q21 serving as a torque transmission surface is processed to such a size that the corresponding tooth surface 38a of the internal spline 38 in the outer shaft 36 and the tooth surface Q21 can be fitted to each other (i.e., pressed into each other) with a negative space therebetween.

The resin coating 39 is processed to such a size that a space S1 is provided between the large-diameter portion 38b (corresponding to the tooth bottom) of the internal spline 38 and a large-diameter portion Q22 of the contour shape Q2 on the surface of the resin coating 39 (corresponding to the tooth tip of an external spline 37 in an inner shaft 35 and matched with a large-diameter portion Q12 of the contour shape Q1 on the inner periphery of the surface broach 46), and a space S2 is provided between a small-diameter portion 38c (corresponding to the tooth tip) of the internal spline 38 and a small-diameter portion Q23 of the contour shape Q2 on the surface of the resin coating 39 (corresponding to the tooth bottom of the external spline 37 in the inner shaft 35 and matched with a small-diameter portion Q13 of the contour shape Q1 on the inner periphery of the surface broach 46).

In a process for pressing the inner shaft manufacturing intermediate member 47 having the resin coating 39 processed with the surface broach 46 having the above-mentioned shape into the outer shaft 36 serving as the counterpart shaft, an actual contact portion is only the tooth surface Q21 serving as a torque transmission surface, and the large-diameter portion Q22 and the small-diameter portion Q23 enter a noncontact state, as illustrated in FIG. 10B. Therefore, a load at which the inner shaft manufacturing intermediate member 47 is to be pressed into the outer shaft 36 can be reduced so that the inner shaft manufacturing intermediate member 47 can be easily pressed into the outer shaft 36.

In the heat fitting process, a sliding load is also reduced. Therefore, the heat fitting processing can be performed with a relatively small equipment capacity. Even if the large-diameter portion Q22 and the small-diameter portion Q23 are negatively spaced apart from the internal spline 38 in the outer shaft 36, a facility having a sufficient capacity can execute the heat fitting processing without any problem.

FIGS. 11A and 11H illustrate a method for manufacturing an intermediate shaft serving as a spline telescopic shaft according to still another embodiment of the present invention. The embodiment illustrated in FIGS. 11A to 11H differs from the embodiment illustrated in FIGS. 9A to 9H in that a groove is formed in the inner shaft manufacturing intermediate member 47 that has passed through a broaching process illustrated in FIG. 11E1 in a groove forming process illustrated in FIG. 11I, to obtain an inner shaft manufacturing intermediate member 147 on which a resin coating 139 having grooves 52 formed thereon is formed, as illustrated in FIG. 11J.

Processes illustrated in FIGS. 11A to 11E1 and 11E2 respectively correspond to the processes illustrated in FIGS. 9A to 9E1 and 9E2, and processes illustrated in FIGS. 11D to 11H respectively correspond to the processes illustrated in FIGS. 9D to 9H. The groove forming process illustrated in FIG. 11I corresponds to the groove forming process illustrated in FIG. 5I.

In the embodiment illustrated in FIGS. 11A to 11H, a similar function effect to that in the embodiment illustrated in FIGS. 9A to 9H is produced, and the grooves 52 are formed in the resin coating 139 before heat fitting processing, as in the embodiment illustrated in FIGS. 5A to 5H. Therefore, abrasion power composed of resin can be incorporated into the grooves 52 in a heat fitting processing process. Therefore, no abnormal abrasion occurs on a surface 139a of the resin coating 139, that is, the surface 139a is not roughened by making the abrasion power huge. Thus, the surface 139a of the resin coating 139 can be fitted to a counterpart in a relatively smooth state.

Although in each of the above-mentioned embodiments, a resin coating that has been subjected to heat fitting processing for a tooth surface of an internal spline in an outer shaft with a zero or negative fitting clearance therebetween is formed on at least a tooth surface of an external spline in an inner shaft, the present invention is not limited to the same. The present invention can be implemented by forming a resin coating that has been subjected to heat fitting processing for a tooth surface of an external spline in an inner shaft with a zero or negative fitting space therebetween on at least a tooth surface of an internal spline in an outer shaft, which is not illustrated.

In the case, when a resin layer formed in an internal spline in an outer shaft manufacturing intermediate member is cut off, to form a resin coating, the resin layer is cut off using an inner shaft in an actual counterpart. Alternately, the resin layer is cut off by broaching using an internal broach. Then, the outer shaft manufacturing intermediate member having the resin coating is fitted to the inner shaft in the counterpart, to perform heat fitting processing by heating by frictional heat generated by forced sliding or heating by an external heater in combination with heating by forced sliding.

Even when the resin layer formed in the internal spline in the outer shaft manufacturing intermediate member is cut off to form the resin coating, a tooth surface serving as a torque transmission surface in the resin coating can be negatively spaced apart from a tooth surface of an external spline in the inner shaft in the counterpart, and a space can be provided between a large-diameter portion of the external spline in the inner shaft (corresponding to the tooth tip of the external spline) and a large-diameter portion of the resin coating (corresponding to the tooth bottom of the internal spline) while a space can be formed between a small-diameter portion of the external spline in the inner shaft (corresponding to the tooth bottom of the external spline) and a small-diameter portion of the resin coating (corresponding to the tooth tip of the internal spline).

Although in each of the above-mentioned embodiments, the vehicle steering apparatus 1 is a so-called column assist type electric power steering apparatus for applying a steering assist force to the steering shaft 3, it may be a so-called pinion assist type electric power steering apparatus for applying a steering assist force to the pinion shaft 7, or may be a so-called rack assist type electric power steering apparatus for applying a steering assist force to the rack shaft 8. It may be applied to a steering apparatus for a manual steering vehicle. The spline telescopic shaft according to the present invention is applicable as a telescopic shaft for telescopically adjusting a steering column.

The present invention will be described below based on an example and a comparative example.

EXAMPLE 1 AND COMPARATIVE EXAMPLE 1

A spline telescopic shaft in an example 1 was produced by providing an inner shaft 35 having a resin coating 139 made of polyamide having a film thickness of 270 μm that had been subjected to heat fitting processing on a surface including a tooth surface 37a of an external spline 37 and combining the inner shaft 35 with a corresponding outer shaft 36 via the processes illustrated in FIGS. 4A to 4H. An internal spline was formed by broaching in the inner diameter of a sleeve composed of a cold forging.

A spline telescopic shaft in a comparative example 1 was produced on a tooth surface of an external spline by combining an inner shaft coated with epoxy resin that had been adjusted to a film thickness of 10 μm by machining with a corresponding outer shaft. The spline telescopic shafts in the example 1 and the comparative example 1 are similar in the material, the shape, and the size of a core of the inner shaft, and are similar in the material, the shape, and the size of the outer shaft.

Durability Test

For each of the spline telescopic shafts in the example 1 and the comparative example 1, a durability test was performed under test conditions, described below, to measure amounts of play (backlash) in a rotation direction of the inner shaft and the outer shaft. A coefficient of friction between tooth surfaces was measured.

Each of the spline telescopic shafts in the example 1 and the comparative example 1 was assembled at a mounting angle of 30° as an intermediate shaft of an actual vehicle steering apparatus, to perform a stationary steering durability test.

Load torque: ±50 Nm
Rotational angle: ±90°
Rotational period: 0.9 Hz
Sliding amount: ±0.5 mm
Test temperature: room temperature As a result, a relationship between the number of times of endurance (the number of repetitions) and the above-mentioned amount of play, as illustrated in FIG. 12, was obtained, and a relationship between the number of times of endurance and the coefficient of endurance, as illustrated in FIG. 13, was obtained. This proved the following.

Referring to FIG. 12, in the comparative example 1, the initial amount of play was 2.8 minutes, and the amount of play was increased to 8 minutes in approximately 400,000 times of endurance. On the other hand, in the example 1, the amount of play at the start of endurance was 0.3 minutes, and an increase in the amount of play was significantly gentle even via the number of times of endurance. Moreover, the amount of play was 2.5 minutes even via 400,000 times of endurance. This proved that a state where there is little backlash was maintained over a long period of time.

Referring to FIG. 13, in the comparative example 1, the coefficient of friction was calculated based on the result of measuring a sliding load when a torque of 30 N·m was loaded to an actual spline product. An initial coefficient of dynamic friction and an initial coefficient of static friction were greater than a coefficient of dynamic friction and a coefficient of static friction in the example 1 by 50% or more. In the comparative example 1, the coefficient of dynamic friction and the coefficient of static friction were greatly increased in approximately 40,000 numbers of endurance.

On the other hand, in the example 1, respective increases in the coefficient of dynamic friction and the coefficient of static friction were significantly gentle even via the number of times of endurance. Moreover, the coefficient of dynamic friction and the coefficient of static friction were respectively 0.11 and 0.09 even via 400,000 times of endurance. This proved that superior sliding properties were maintained over a long period of time.

While the invention has been described in detail with respect to specific embodiments thereof, it will be appreciated that those skilled in the art, upon attaining an understanding of the foregoing, may readily conceive of alternations to, variations of, and equivalents to these embodiments. Accordingly, the scope of the present invention should be assessed as that of the appended claims and any equivalents thereto.

This application claims priority from Japanese Patent Application No. 2009-184541 filed with the Japanese Patent Office on Aug. 7, 2009, the disclosure of which is hereinto incorporated by reference in its entirety.

What is claimed is:

1. A spline telescopic shaft comprising:
   a first shaft and a second shaft that are fitted to each other slidably in an axial direction;
   a first spline and a second spline that are respectively provided at the first shaft and the second shaft and that engage with each other; and
   a resin coating that is provided on at least a tooth surface of the first spline and that includes a surface fitted to a tooth surface of the second spline, a clearance being provided between the surface of the resin coating and the tooth surface of the second spline;

wherein a groove extending in a direction crossing the axial direction is formed on the surface of the resin coating;

wherein at least a part of an abrasion powder composed of resin produced as a result of a heat fitting processing for sliding an intermediate member for manufacturing the first shaft and the second shaft in the axial direction is contained in the groove;

wherein the first spline and the second spline extend in the axial direction; and wherein the clearance provided between the surface of the resin coating and the tooth surface of the second spline is a fitting clearance between the corresponding tooth surfaces of the first spline and the second spline, the fitting clearance being 10 μm or less.

2. A vehicle steering apparatus for transmitting a steering force using the spline telescopic shaft according to claim 1.

3. The spline telescopic shaft according to claim 1, wherein one of the first shaft and the second shaft comprises an inner shaft, and the other of the first shaft and the second shaft comprises an outer shaft.

4. The spline telescopic shaft according to claim 1, wherein:

the first shaft includes a core;

the resin coating coats a periphery of the core; and the groove extending in the direction crossing the axial direction is formed on only the surface of the resin coating and the surface of the core.

5. The spline telescopic shaft according to claim 1, wherein:

a depth of the groove extending in the direction crossing the axial direction is at least one of 50% or more of a thickness of the resin coating, or 0.1 mm or more of the thickness of the resin coating; and wherein the depth of the groove extending in the direction crossing the axial direction is smaller than the thickness of the resin coating.

* * * * *